(12) United States Patent
McBride

(10) Patent No.: US 8,684,414 B1
(45) Date of Patent: Apr. 1, 2014

(54) VEHICLE PASSENGER SEAT RESTRAINT

(76) Inventor: Terri McBride, Deerfield Beach, FL (US)

( * ) Notice: Subject to any disclaimer, the term of this patent is extended or adjusted under 35 U.S.C. 154(b) by 243 days.

(21) Appl. No.: 13/104,917

(22) Filed: May 10, 2011

(51) Int. Cl.
*B60R 22/26* (2006.01)
*B60R 22/22* (2006.01)

(52) U.S. Cl.
USPC .................. 280/808; 280/801.1; 280/801.2; 297/467; 297/468; 297/484; 297/486; 297/487

(58) Field of Classification Search
USPC ............ 280/748, 801.1, 801.2, 808; 297/464, 297/467, 468, 482–487
See application file for complete search history.

(56) References Cited

U.S. PATENT DOCUMENTS

| | | | |
|---|---|---|---|
| 5,306,044 A * | 4/1994 | Tucker | 280/801.1 |
| 5,524,928 A * | 6/1996 | Monagas | 280/808 |
| 6,217,068 B1 * | 4/2001 | Trainum et al. | 280/801.1 |
| 7,131,668 B2 * | 11/2006 | Go | 280/808 |
| 7,201,399 B2 * | 4/2007 | Frank et al. | 280/801.1 |
| 2004/0140660 A1 * | 7/2004 | Xu | 280/808 |
| 2004/0251675 A1 * | 12/2004 | Herberg et al. | 280/806 |
| 2009/0212549 A1 * | 8/2009 | Jones | 280/801.2 |

* cited by examiner

*Primary Examiner* — Ruth Ilan
*Assistant Examiner* — Darlene P Condra
(74) *Attorney, Agent, or Firm* — Gulf Coast Intellectual Property Group

(57) ABSTRACT

A multi-point seat restraint system configured to provide restraint for a passenger superposed a seat in a supine position. The multi-point seat restraint system includes a plurality of upper belts having a first end anchored behind the seat back of the associated seat. A junction bar is further included wherein the junction bar is configured to releasably secure the upper belts proximate the second end of the plurality of upper belts. The junction bar further includes a first belt portion and a second belt portion integrally secured thereto. The first belt portion and second belt portion and configured to be releasably secured to a first lower belt and a second lower belt. The first lower belt and second lower belt are retractably mounted to the floorboard of the vehicle. In an alternative embodiment of the second lower belt, the second lower belt includes a first portion and a second portion being angularly mounted.

10 Claims, 2 Drawing Sheets

VEHICLE PASSENGER SEAT RESTRAINT

FIELD OF THE INVENTION

The present invention relates to a seat restraint for a passenger of a vehicle, more specifically but not by way of limitation a seat restraint that is operable to provide proper restraint for a passenger in a supine position.

BACKGROUND

Passenger restraint systems such as seat belts are known to increase safety and substantially inhibit injuries during an accident. The increased awareness of seat belt utilization and the benefits thereof have propagated the driving community over the last several decades. Most states in the United States have instituted legislation mandating their use by vehicle occupants. Currently manufactured vehicles utilize numerous different types of configurations of seat belts. Lap belts are commonly utilized in the rear passenger seats of a vehicle and are configured to traverse an occupant's lower abdomen. The lap belt typically utilizes a releasable buckle for fastening. Another conventional type of seat belt is a lap belt combined with a shoulder harness. This configuration combines the belt traversing the lower abdomen with an additional belt that traverses the upper torso and shoulder region providing an additional point of restraint. Both of the aforementioned seat belt configurations are utilized in the rear seats of many passenger vehicles manufactured today.

One problem with current seat belt configuration is the failure for the seat belt to properly restrain a passenger in a supine position. It is very common for individuals engaged in a long trip to lie in a prone or supine position in the rear seat of the vehicle. Current lap belts and other seat belt configurations are unable to be adjusted to provide proper restraint for the passenger in the supine position. Conventional lap belts may traverse the supine passenger's legs or neck area, which could potentially result in significant injury if an accident occurred.

Another problem with current passenger restraint systems is there inability to be adapted to secure cargo. Many owners of vehicles will utilize the rear seats of their vehicle to place a variety of objects to be transported. Without the ability to secure these items, the items can be potentially dangerous to the occupants of the vehicle if the vehicle is involved in an accident. These items can become deadly projectiles potentially causing substantial injuries to the occupants of the vehicle.

Accordingly there is a need for a passenger restraint system for a vehicle that can be adapted to properly restrain a passenger in a supine position wherein the passenger restraint system is further configurable to secure cargo.

SUMMARY OF THE INVENTION

It is the object of the present invention to provide a vehicular restraint system that is configurable to provide improved restraint for passengers in a supine position.

Another object of the present invention is to provide a vehicular restraint system that can be configured to restrain cargo in the seat of the vehicle when not in use by an occupant.

Yet a further object of the present invention is to provide a vehicular seat restraint system that includes a plurality of upper restraint belts and a plurality of lower restraint belts.

Still another object of the present invention is to provide a vehicular seat restrain system operable to secure a supine passenger that includes a junction bar to secure the plurality of upper restraint belts and the lower restraint belts.

An additional object of the present invention is to provide a lower seat restraint that further includes a y-adapter operable to provide a lower seat restraint leverage point for adjacent passengers wherein one passenger is in a seated position and the adjacent passenger is in a supine position.

Still a further object of the present invention is to provide a passenger seat restraint system that secures a passenger in a supine position that includes lower restraint belts that are retractably mounted to the floorboard of the vehicle.

Another object of the present invention is to provide a passenger seat restraint system configurable to secure a passenger in a supine position that can integrate with existing seat belts of a passenger vehicle.

A further object of the present invention is to provide a passenger seat restraint system that is configurable to provide restraint for a passenger in a supine position or cargo that has been placed in the rear seat that is easy to use.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
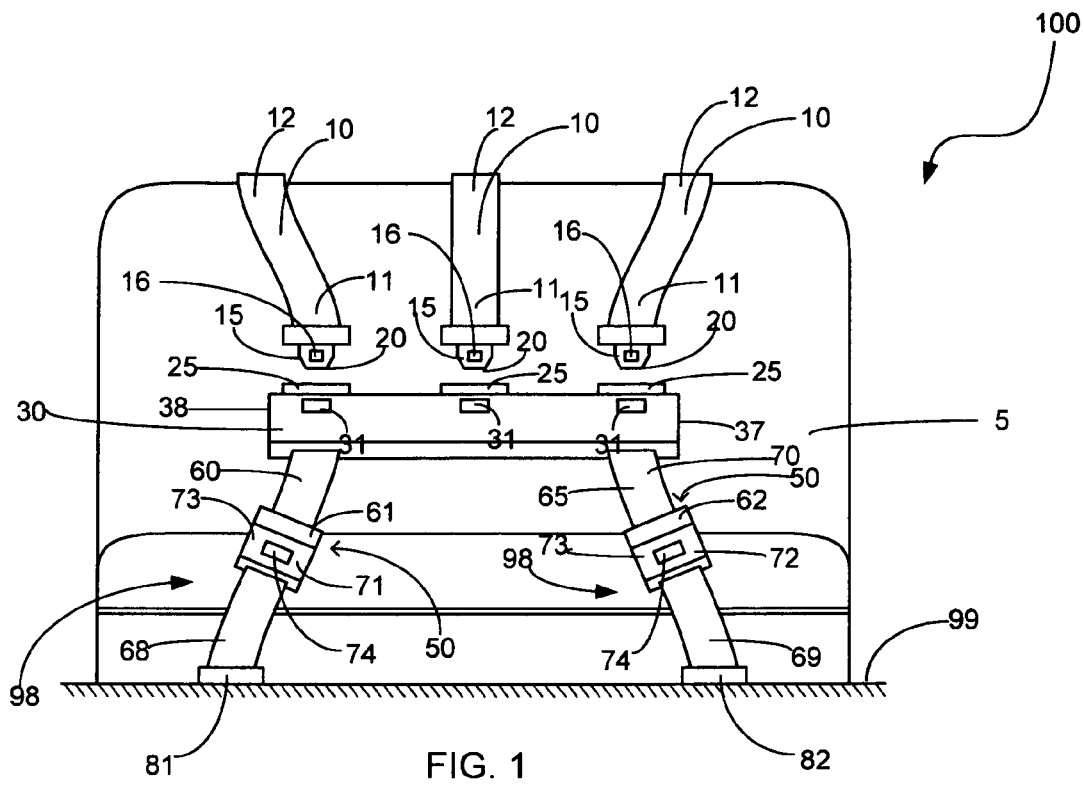
FIG. 1 is a front view of an embodiment of the present invention.
Figure 2:
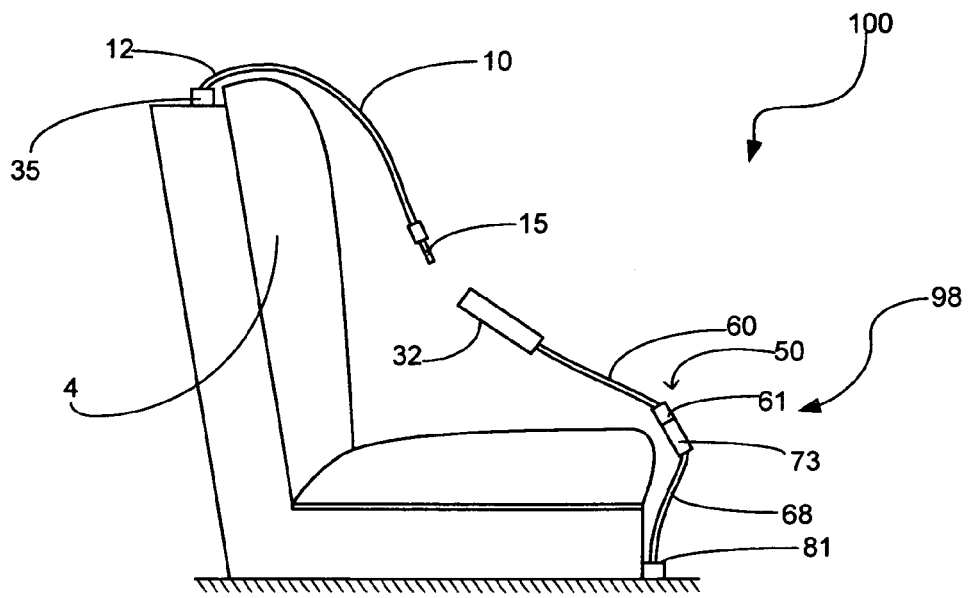
FIG. 2 is a side view of an embodiment of the present invention.

Referring now to the drawings submitted herewith, wherein various elements depicted therein are not necessarily drawn to scale and wherein through the views and figures like elements are referenced with identical reference numerals, there is illustrated a multi-point restraint system 100 constructed according to the principles of the present invention.

The multi-point restraint system 100 further includes a plurality of upper belts 10 having a first end 11 and a second end 12. The plurality of upper belts 10 traverse the upper portion of the seat 5 and are generally planar in manner and are manufactured from a suitable durable material such as but not limited nylon or other similar materials. Proximate the first end 11 of the upper belts 10 is are tongue plates 15. The tongue plates 15 are generally planar in manner are manufactured from a suitable durable material such as but not limited to metal. The tongue plates 15 include an angular front perimeter edge 20 that is designed to facilitate the guidance of the tongue plates 15 into the slots 25 of the junction bar 30. The tongue plates 15 include an aperture 16 that will receive therethrough a pin (not illustrated herein) disposed within the junction bar 30 so as to releasably secure the tongue plates 15. The pins are operably connected to buttons 31 and function similarly to conventional seat belt securement mechanisms. The upper belts 30 provide an increase in restraint points over conventional three point seat belt systems. Conventional three point seat belt systems fail to provide proper restraint points for either an object placed in the seat 5 or for a person in a supine position in the seat 5. The upper belts 10 are distributed along the seat so as to promote increased points of restraint and load distribution for either an object placed in the rear seat or a person in a supine position. While good results have been achieved utilizing three upper belts 10 in constructing the multi-point restraint system 100, it is further contemplated within the scope of the present invention that the more or less than three upper belts 10 could be utilized in the multi-point restraint system 100 to increase or decease the load restraint points. The multi-point restraint system 100 functions to provide sufficient restraint points for a supine passenger. In order to provide restraint points for a supine passenger superposed the seat 5, good results have been achieved by utilizing three upper belts 10 that are approximately eighteen to twenty four inches apart so as to distribute the load impact across the supine passenger in the event of an impact.

The upper belts 10 are secured behind the vertical portion 4 of the seat 5 proximate end 12. The upper belts 10 are retractably mounted within the housing 35 utilizing the refraction mechanism 40 disposed therein. The housing 35 is secured utilizing suitable durable methods such as but not limited to mechanical fasteners. The retraction mechanism 40 is a conventional retraction assembly consisting of a spool 41, bracket 42 and sprocket 43 that controls the release or retrieval of the upper belts 10. While the multi-point restraint system 100 in its preferred embodiment utilizes a retraction mechanism 40 disposed within a housing 35 to store the upper belts 10 when not in use, it is further contemplated within the scope of the present invention that the upper belts 10 could be anchored utilizing bolts or similar fasteners and not utilize the retraction mechanism.

The junction bar 30 is generally elongated and rectangular in shape and function to operably connect the upper belts 10 with the lower belts 50. The junction bar 30 is manufactured from a suitable durable material such as but not limited to plastic. The junction bar 30 functions to provide and equalized load distribution to either an object or a supine oriented person in the event of a vehicle impact. During a vehicle impact the junction bar 30 will engage a person in a supine position such that the load distribution of the restraint will be axially aligned across substantially the entire torso of the person. This load distribution provides increased restraint to a person in a supine position as opposed to a conventional lap belt or three point belt system that can only engage one restraint point subsequent a person placing themselves in a supine position. Those skilled in the art will recognize that the junction bar 30 could be manufactured in numerous different lengths to accommodate objects or person of different sizes. While no particular length is required, good results have been achieved utilizing a junction bar 30 that is approximately eighteen to thirty inches in length. It is further contemplated within the scope of the present invention that the junction bar 30 could have a gel padding along the bottom surface 32 to decrease the force of the impact of the junction bar 30 on either the object or supine oriented person engaged with the multi-point restraint system 100.

The junction bar 30 further includes a first lower belt 60 and a second lower belt 65. The first lower belt 60 and second lower belt 70 are planar in manner and secured to the junction bar 30 utilizing suitable durable methods such as but not limited to mechanical fasteners. The first lower belt 60 and second lower belt 65 are integrally attached to the junction bar 30 and include a tongue plate 61, 62 constructed similarly to tongue plates 15 as previously described herein. The tongue plates 61, 62 are illustrated being operably coupled to buckles 71,72 respectively. The buckles 71,72 consist of a housing 73 and include an actuator button 74 configured to release the buckles 71,72 from the tongue plates 61,62. The first lower belt 60 and second lower belt 65 of the junction bar 30 operably engage with the third lower belt 68 and fourth lower belt 69. During impact is a person is in a supine position in the seat 5, the first lower belt 60 and second lower belt 65 will engage either the thigh region or upper torso region of the person dependent upon the direction of orientation of the individual. As the impact occurs, the first lower belt 60 and second lower belt 65 provide additional restraint points for distribution of the load of impact.

The third lower belt 68 and fourth lower belt 69 are retractably mounted within housings 81,82. The housings 81, 82 are manufactured of suitable durable material such as but not limited to metal and are substantially hollow so as to accommodate the retraction mechanism 40 therein. The housings 81,82 are secured to the floorboard 99 utilizing suitable durable methods such as but not limited to mechanical fasteners. The refraction mechanisms 40 disposed within the housings 81,82 and function to facilitate the positioning of the third lower belt 68 and fourth lower belt 69 in a retracted position wherein the buckles 71,72 are proximate the floorboard 99 when the multi-point restraint system 100 is not in use. It is contemplated within the scope of the present invention that while two lower belts 98 are illustrated herein, that more than two lower belts 98 could be utilized in the multi-point restraint system 100.

Figure 4:
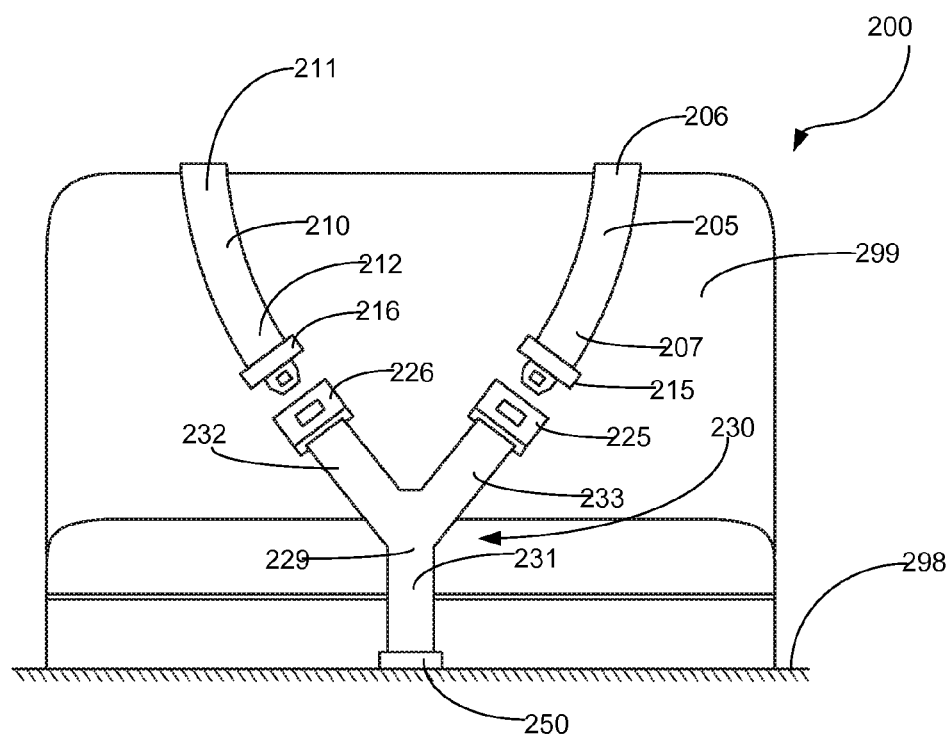
FIG. 4 is an alternative embodiment of the present invention.

Illustrated in particular in FIG. 4 is alternative embodiment of the multi-point restraint system 200. The multi-point restraint system 200 includes a first upper belt 205 and a second upper belt 210 constructed of a suitable durable material. The first upper belt 210 includes a first end 206 and second end 207. The first end 206 is anchored behind the seat 299 utilizing suitable durable methods such as but not limited to mechanical fasteners. The second upper belt 210 includes first end 211 and second end 212 wherein the first end 211 is anchored similarly as the first end 206. Integrally connected with the second ends 207, 212 are tongue plates 215, 216. The tongue plates 215,216 are constructed similarly to tongue plates 15 as previously described herein. The tongue plates 215, 216 operably couple with buckles 225, 226 respectively.

The multi-point restraint system 200 includes a lower belt 230 that has a first portion 231, second portion 232 and third portion 233. The first portion 231 is configured in a generally perpendicular manner with respect to the floorboard 298. The first portion 231 is retractably mounted within the housing 250 as previously described herein utilizing the refraction mechanism 40. Proximate the second end 229 of the first portion 231 the second portion 232 and third portion 233 are angularly mounted. The second portion 232 and third portion 233 are integrally formed with the first portion 231. The angular arrangement of the second portion 232 and third portion 233 functions to engage a person in a supine position on the seat 299 with an improved distribution load as compared to a conventional lap belt or three point seat belt. The lower belt 230 is positioned such that the second portion 232 will traverse the torso area of a supine user while the third portion 233 will traverse the thigh region of the user. This arrangement provides increased points of restraint when compared to conventional seat belt systems and promotes a distributed impact load across several points of a supine user during the event of an impact. It is contemplated within the scope of the present invention that the lower belt 230 could be utilized in conjunction with a conventional lap belt and/or shoulder harness to provide restraint for an individual in a seated position. Additionally, it is further contemplated within the scope of the present invention that more than one lower belt 230 could be utilized to accommodate additional supine users or so as to accommodate a supine user that is adjacent to a seated user. Furthermore, it is contemplated within the scope of the present invention that the lower belt 230 could be operably connected to the junction bar 30.

Figure 3:
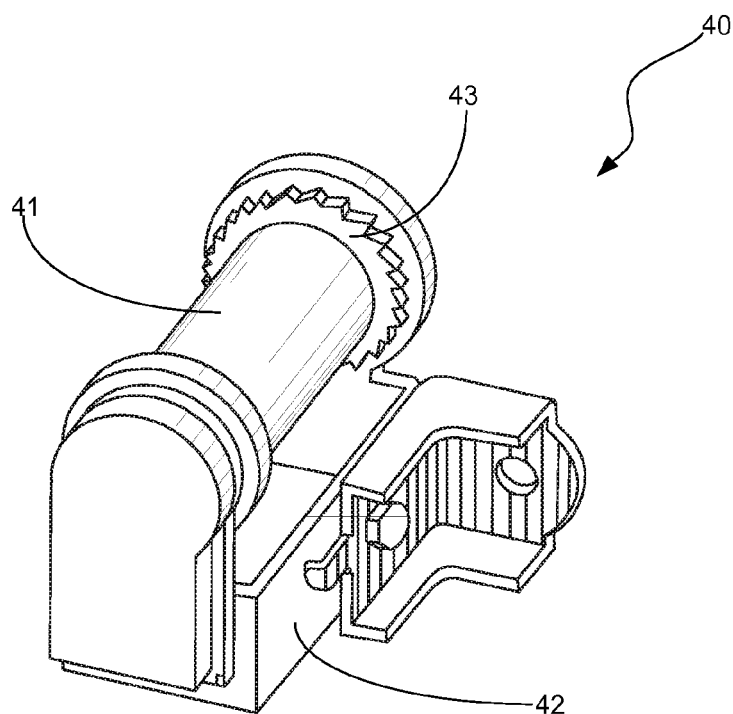
FIG. 3 is a perspective view of the belt refraction device of the present invention.

A description of the operation of the multi-point restraint system 100 is as follows. Referring in particular to FIGS. 1 and 3, in use a user will orient themselves in a supine position on the seat 5. The upper belts 10 are releasably secured to the junction bar 30 and the lower belts 98 are operably coupled. The user is oriented with respect to the junction bar 30 such that the ends 37,38 are approximately positioned proximate the lower waist area and the upper torso depending upon directional orientation of the supine user. During the event of an impact, the lower belts 98, upper belts 10 and junction bar provide numerous points of restraint and load distribution to the user in the supine position.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A seat belt device operable to provide restraint to a passenger in a vehicle seat wherein the passenger is in a supine position comprising:
    a first upper belt, said first upper belt having a first end and a second end, said first end of said first belt being anchored behind the seat back of the associated seat, said first upper belt extending downward across the seat back;
    a second upper belt, said second upper belt having a first end and a second end, said first end of said second belt being anchored behind the seat back of the associated seat, said second upper belt extending downward across the seat back of the associated seat, said second upper belt being located at least one foot apart from said first upper belt, said second end of said first upper belt and said second end of said second upper belt further include tongue plates, said tongue plates being integrally secured to said second end, said tongue plate further including an aperture, said tongue plate further including an angular perimeter edge;
    a lower belt, said lower belt having a first portion, a second portion and a third portion, said first portion of said lower belt having a first end and a second end, said first end of said first portion being anchored to the floorboard of the vehicle in which the seat belt device is disposed, said first portion of said lower belt being retractably mounted to the floorboard, said second portion and said third portion being integrally secured to said second end of said first portion, said second portion having a first end and second, said third portion having a first end and a second end, said first end of said second portion and said third portion being angularly secured to said first portion so as to traverse across the restrained passenger at different points on the passenger's body, said second end of said second portion of said lower belt further including a buckle, said buckle configured to releasably secure said tongue plate of said first upper belt; and
    wherein the seat belt device is configured to provide at least two points of restraint for a passenger superposed on the associated seat in a supine position.

2. The seat belt device as recited in claim 1, wherein said second end of said third portion of said lower belt includes a buckle, said buckle configured to releasably secure said tongue plate of said second upper belt.

3. The seat belt device as recited in claim 2, wherein subsequent said lower belt being operably connected to said first upper belt and said second upper belt said first upper belt and said second upper belt provide restraint points to a supine user that are at least eighteen to twenty four inches apart.

4. The seat belt device as recited in claim 3, wherein said first upper belt and said second upper belt are retractably mounted behind the associated seat.

5. A multi-point seat restraint system for a vehicle operable to secure a supine passenger or an object superposed a seat in a vehicle comprising:
    three upper belts, said three upper belts having a first end and a second end, said three upper belts configured to traverse the seat back of the associated seat, said three upper belts further including a tongue plate integrally mounted proximate each of said second end, said three upper belts being retractably mounted behind the seat back of the associated seat;
    two lower belts, said two lower belts having a first end and a second end, said two lower belts retractably mounted to the floorboard of the associated seat, said two lower belts further including a first buckle and a second buckle, said first buckle and said second buckle being integrally secured proximate said second ends of said two lower belts; and
    a junction bar, said junction bar being generally rectangular in shape, said junction bar including a first side and a second side, said first side having mounted therein three receiver slots, said three receiver slots operable to releasably secure said second ends of said three upper belts.

6. The multi-point seat restraint system as recited in claim 5, wherein said junction bar further includes a first belt portion and a second belt portion, said first belt portion and said second belt portion mounted opposite said three receiver slots.

7. The multi-point seat restraint system as recited in claim 6, wherein said first belt portion and said second belt portion further include a first end and a second end, said first belt portion including a first tongue plate integrally secured thereto proximate said second end, said second belt portion including a second tongue plate integrally secured thereto proximate said second end.

8. The multi-point seat restraint system as recited in claim 7, wherein said junction bar is in general axial alignment with a user that is superposed in a supine position on the associated seat.

9. The multi-point seat restraint system as recited in claim 8, wherein said junction bar is manufactured having a length within the range of eighteen inches to thirty inches.

10. The multi-point seat restraint system as recited in claim 9, wherein one of said two lower belts is configured to have a first upper portion and a second upper portion, said first upper portion being angularly mounted with respect to said second upper portion, said first upper portion configured to engage said junction bar, said second upper portion configured to engage and adjacent seat belt of the associated seat.

* * * * *